United States Patent [19]
Walker et al.

[11] 4,455,941
[45] Jun. 26, 1984

[54] DETONATING CORD AND CONTINUITY VERIFICATION SYSTEM

[76] Inventors: Richard E. Walker, 431 Sherer Blvd., Cocoa, Fla. 32922; James D. Heckelman, Old State Rd., Norwalk, Ohio 44857; Robert A. Ziemke, 1813 Sandusky St., Sandusky, Ohio 44870

[21] Appl. No.: 487,892

[22] Filed: Jun. 3, 1983

Related U.S. Application Data

[60] Division of Ser. No. 226,449, Jan. 19, 1981, Pat. No. 4,403,143, which is a continuation of Ser. No. 957,438, Nov. 3, 1978, abandoned.

[51] Int. Cl.³ ............... C06C 5/04; F42C 19/00
[52] U.S. Cl. .................... 102/275.8; 102/201
[58] Field of Search ........... 102/275.1, 275.5, 275.8, 102/275.6, 201

[56] References Cited

U.S. PATENT DOCUMENTS

| | | | |
|---|---|---|---|
| 2,102,024 | 12/1937 | Pearsall | 102/275.1 |
| 2,498,050 | 2/1950 | Selvidge | 102/275.8 |
| 3,408,937 | 11/1968 | Lewis et al. | 102/201 |
| 3,618,526 | 11/1971 | Baker | 102/201 |

Primary Examiner—David C. Nelms
Assistant Examiner—Edward P. Westin
Attorney, Agent, or Firm—William P. Hickey

[57] ABSTRACT

A fuse or ignition conductor for conducting ignition from an igniter to a remotely located primer, as used in the detonation of explosives. The ignition conductor contains a light transmitting fiber optic cord bound to the ignition conducting material of the fuse in such manner that if the ignition conducting material is broken, the fiber optic cord is also broken. The claimed subject matter further includes assemblies containing means at the primer end for transmitting light back to the igniter end.

9 Claims, 4 Drawing Figures

DETONATING CORD AND CONTINUITY VERIFICATION SYSTEM

This is a division of application Ser. No. 226,449 filed Jan. 19, 1981, now U.S. Pat. No. 4,403,143; which in turn is a continuation of application Ser. No. 957,438 filed Nov. 3, 1978 now abandoned.

BACKGROUND OF THE INVENTION

The present invention relates to blasting operations wherein a network of detonating cord is strung from a blast initiating position to a plurality of charges that are positioned down in a plurality of separate blast holes. Blast holes, of course, must first be drilled, the explosive loaded into each, a primer and detonating cord placed on top of each charge, and each hole sealed to confine the explosion. The detonating cord can be broken in the hole where it is impossible to observe, particularly when sealing stemming is rammed on top of the primer; and it is also possible for an unobservable defect or break to occur in the section of detonating cord running across the top of the ground. Detonating cord has been used for many years. More recently electrical wires and blasting caps have been used to set off the charges electrically. It is possible to check the continuity of the electric wires by low energy current, but a number of accidents have occurred when lightning or inadvertant stray current has struck the system before ignition. The art has progressed to setting off larger and larger numbers of explosive charges at one time. This has resulted in explosive charges being left undetonated due to faulty wiring, breaks in the detonating cord, etc. When this occurs, the charges must be either rendered harmless, or retrieved or detonated separately before the excavating crew can safely enter the area. The work of deactivating live charges that are left after a blast constitute a considerable hazard to the deactivating crew.

An object of the present invention is the provision of a new and improved detonating system whose continuity can be checked before blast initiation, and which is unlikely to be set off by lightning or stray electrical currents.

Further objects and advantages of the invention will become apparent to those skilled in the art to which the invention relates from the following description of applicants' preferred embodiments described with reference to the accompanying drawings.

DESCRIPTION OF THE PREFERRED EMBODIMENTS

Although the invention is capable of more simplistic embodiments, the preferred embodiment is herein shown and described as comprising four principle parts. The preferred embodiment utilizes an inexpensive form of the detonating cord of the present invention; and an automatic electronic means which, upon the push of a button, will positively indicate continuity of the detonating cord. The four principle parts of the preferred embodiment comprise: a detonating cord capable of transmitting light between a blasting cap and primer; a disposable head adjacent the blasting cap for sending light down the primer in response to an electrical signal, and for providing an output signal in response to light received from the primer end; means at the primer end for returning light through the detonating cord; and an electronic control which initiates a signal to the disposable head and which interrogates the disposable head to provide an indication of continuity. As previously indicated, one or more of the components can be simplified, and some of these simplifications will be explained during and after the description of the preferred embodiments.

Figure 1:
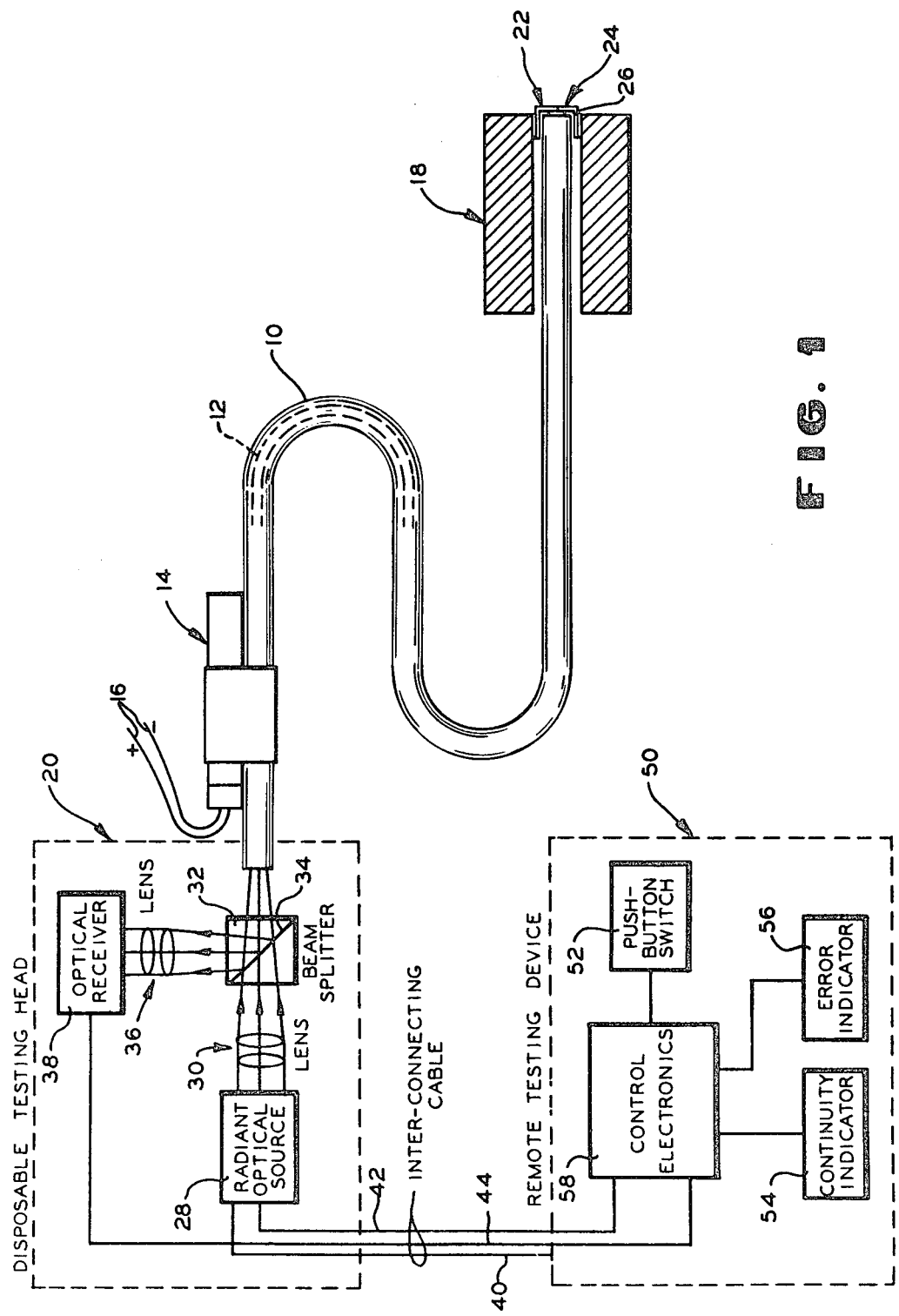
FIG. 1 is a schematic block diagram showing one embodiment of the present invention.

The detonating cord 10 shown in FIG. 1 of the drawings is made light conductive by having the detonating material extruded around a fiber optic cord indicated by the dotted lines 12. The detonating cord 10 can be made in a continuous length that is wound into a coil and cut in the field to the proper length for connecting a blast igniting primer that is located beneath the surface of the earth to a detonating cap a safe distance away. A blasting cap 14 having a pair of igniting wires 16 is strapped to the blast initiating end of the detonating cord 10 in the customary manner. The other end of the detonating cord 10 extends into a conventional sleeve type primer 18 that is positioned on top of the explosive beneath the surface of the earth. A disposable test head 20 is fitted onto the blast initiating end of the detonating cord in such manner that the testing head can supply light to the end of the fiber optic cord 12, and at the same time, receive light that is sent back from the primer end of the detonating cord.

In the particular embodiment shown in FIG. 1, the detonating cord 10 has only a single fiber optic cord 12 therein. The light that is supplied by the disposable testing head 20 must be transmitted to the remote end of the detonating cord, and by suitable means 22 located there, light must be caused to pass back through the fiber optic cord 12 to the disposable testing head 20. Since there is only one fiber optic cord, the light returned by means 22 must be distinguishable from that supplied by the disposable head 20. In the embodiment shown, the means 22 comprises an opaque detonating cord cover 24 having a phosphorescent coating 26 on the inside thereof facing the end of the detonating cord 10. As is well known, phosphorescent materials have the property of giving off light for a considerable period of time after they have been illuminated, and the system shown in the drawing is specifically constructed to utilize this property as the distinguishing feature by which it determines that light has come from the primer end of the detonating cord. It will be understood that other embodiments of the invention may utilize a separate return channel for the light, or a device which causes the returning light to have a different quality from the light that is produced by the testing head 20. If the detonating cord 10 contains two fiber optic cords 12, or a single returning cord, the continuity could be simply checked, for example, by illuminating one of the ends of the fiber optic cord and visually observing the adjacent end of the other fiber optic cord.

Continuing with the embodiment shown in the drawings, the preferred embodiment of detonating cord may be cut to any suitable length, the cover 24 installed on the primer end, and the disposable testing head 20 installed on the end of the detonating cord adjacent the blasting cap 14. The disposable testing head 20 shown in the drawing comprises a radiant optical source 28, which in the embodiment shown is an LED, emitted light which is focused by the lens 30 through one surface of a beam splitting prism 32, onto the fiber optic cord. The light coming from the lens 30 passes through the beam splitting prism 32 to the end of the detonating cord that is received in the disposable head 20. Light coming back from the detonating cord 10 is reflected off of the interface 34 onto lenses 36 which concentrate the light onto a light sensitive device 28, hereafter called an LSD and which in the present embodiment is a phototransistor. A ground wire 40 is connected to one terminal of the LED 28 and the LSD 38, and extends to a remote testing device, which will later be described. A signal input wire 42 that is connected to the LED 28, and an output signal wire 44 that is connected to the LSD 38 also extend to the remote testing device.

Figure 3:
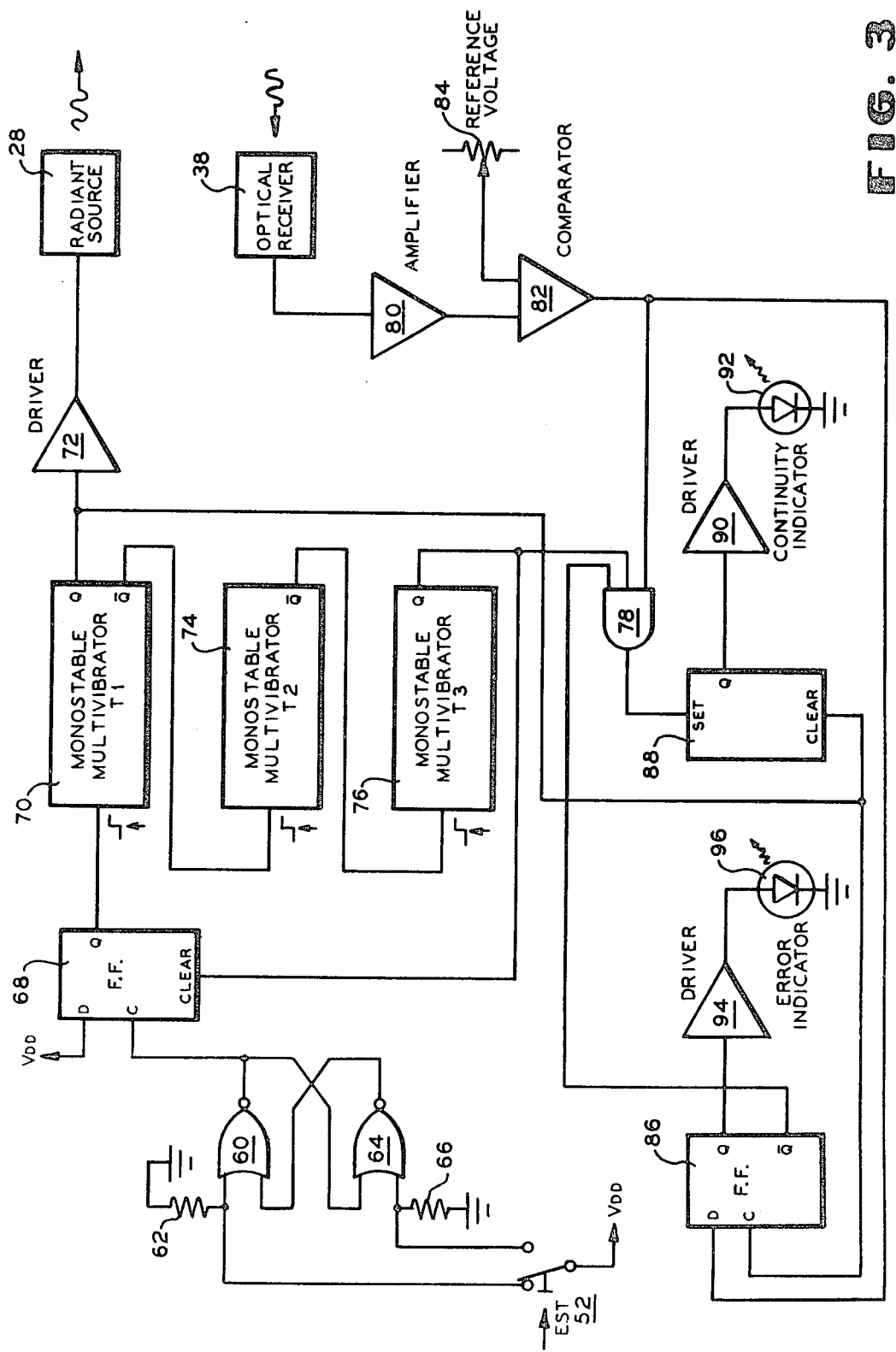
FIG. 3 is an electrical schematic of the disposable testing head and remote testing device shown in FIG. 1.

The remote testing device 50 shown in the drawings will, of course, be located at a safe location, and generally comprises: a push button 52 used to actuate the device; a continuity indicator 54, which in the present instance, is a panel light; an error indicator 56, which in the present instance is a panel light; and electronic circuitry 58, which is shown in detail in FIG. 3 and which is about to be described.

Figure 2:
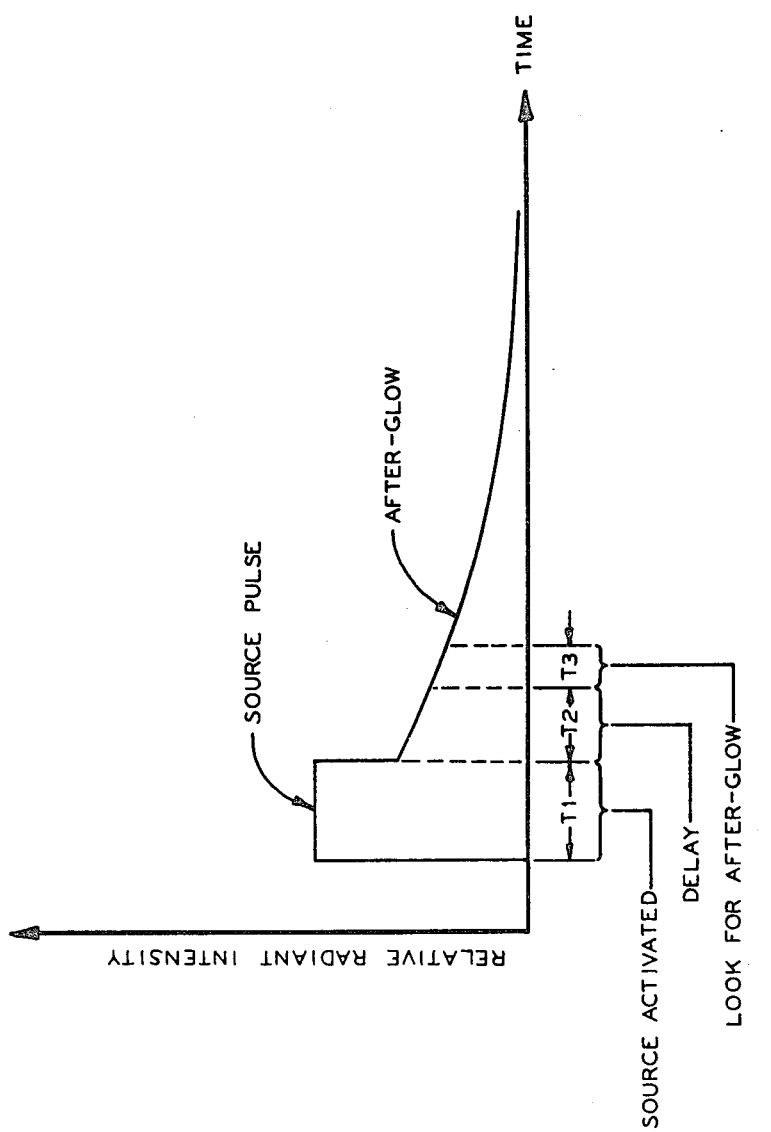
FIG. 2 is a graph showing a time sequence that is utilized in the embodiment shown in FIG. 1.

The electronic circuitry of FIG. 3 will produce an energizing signal for a time period T1 to the LED 28, followed by a time delay period T2, that in turn is followed by a time period T3 during which it checks for continuity. FIG. 2 of the drawings shows the relative light intensity produced by the LED during the T1 period, followed by the afterglow produced by the fluorescent coating 26 during the time periods T2 and T3. Test switch 52 is a two position switch, the pole of which is connected to a positive supply voltage Vdd. The normally closed contact of the switch is connected to one terminal of NORgate 60, as well as to ground through a resistance 62. The other input terminal of NORgate 60 is connected to the output of NORgate 64. One input terminal of the NORgate 64 is connected to the normally open contact of the push botton switch 52, as well as to ground through a resistance 66. The other input terminal of the NORgate 64 is connected to the output terminal of NORgate 60, as well as to the clocking terminal of a flip-flop 68. This arrangement provides a debounce latch arrangement between mechanical switch 52 and flip-flop 68.

Power for the flip-flop is also supplied from the Vdd voltage source, as well as to the remainder of the electronic components, as is well known. The Q output of flip-flop 68 is connected to the input trigger input terminal of a monostable multivibrator 70 that is designed to provide a positive voltage on its Q output for the time period T1 which in the present instance, is approximately 0.1 seconds. The Q-bar output of the monostable vibrator 70 is connected to the input of an amplifier 72, the output of which is in turn connected by wire 42 to the LED 28. The positive output from the flip-flop 68, therefore, triggers the multivibrator 70 so that it causes the LED to be lit for the time period T1. The Q-bar output of the monostable multivibrator is connected to the trigger input terminal of a monostable multivibrator 74. During the time period T1, the Q-bar output of monostable multivibrator 70 is zero; and at the end of the time period T1, the Q output of monostable vibrator 70 goes to zero and the Q-bar output goes positive. The positive voltage supplied to the trigger input of monostable vibrator 74 causes its Q-bar output to go to zero for the time period T2 following which the Q-bar output goes positive. The Q-bar output of monostable multivibrator 74 is connected to the trigger input of monostable vibrator 76, and upon receiving a positive signal from the monostable multivibrator 74, its Q output goes positive for the time period T3. The Q output of monostable vibrator 76 is connected to the clear terminal of the flip-flop 68 to reset the flip-flop. The Q output of monostable vibrator 76 is also connected to one input terminal of an ANDgate 78 having a total of three inputs.

Assuming that there is continuity in the detonating cord 10, return light from the fluorescent coating 26 will cause the LSD 38 to provide a positive voltage on the output signal wire 44. The wire 44 is connected to the input of amplifier 80, the output of which is connected to the noninverting input of a comparator 82. The reference voltage indicated by the potentiometer 84 is supplied to the inverting input terminal of comparator 82, so that the output of the amplifier 82 stays zero until the voltage from the amplifier 80 exceeds that of the potentiometer 84. The voltage supplied by the potentiometer 84 is set at a level below that which the fluorescent coating 26 causes during the T3 time period; and assuming that continuity exists in the detonating cord, the output of comparator 82 will be positive during the T3 time period. The output terminal of comparator 82 is connected to the second input of ANDgate 78 and to the steering terminal D of flip-flop 86, the voltage condition of which is transferred to its Q output when its clocking terminal C is energized. The clocking terminal C of the flip-flop 86 is supplied with voltage from the Q output of monostable vibrator 70, which after time period T1, reverts to the low voltage condition. At this time, the Q output of flip-flop 86 is at a zero condition while the Q-bar output is positive. The Q-bar output of flip-flop 86 is communicated to the third input of the ANDgate 78, so that when continuity exists during the T3 time period, ANDgate 78 provides an output voltage that is communicated to the set terminal of another flip-flop 88. The Q output terminal of flip-flop 88 is connected to an amplifier 90, whose output is connected to a light emitting diode 92, which is energized at this time to indicate continuity. The Q output of monostable multivibrator 70 is also connected to the clear input of flip-flop 88 to be sure that the flip-flop is reset during each cycle when the T1 time period begins.

The circuitry described performs still another function of providing a positive error signal if, because of stray light, the optical receiver 38 should give an output signal at the beginning of the T1 time period. The Q output of flip-flop 86 is connected to an amplifier 94 whose output is in turn connected to an LED 96 for indicating the error signal. Assuming that the output signal wire 44 has a voltage at the time the unit is turned on, this voltage will appear at the steering terminal of flip-flop 86. As previously explained, the Q output of monostable multivibrator 70 goes high at the beginning of the T1 time period. This output is connected to the clocking terminal of the flip-flop 86, which thereupon causes its Q output to go high. The Q output of flip-flop 86 is connected to the input of amplifier 94, which in turn causes the error indicator 96 to become lit. At the same time, the Q-bar output of flip-flop 86 goes low, and this low voltage is supplied to the third input of the ANDgate 78 to prevent a subsequent continuity indication by the LED 92 during the T3 time period.

Figure 4:
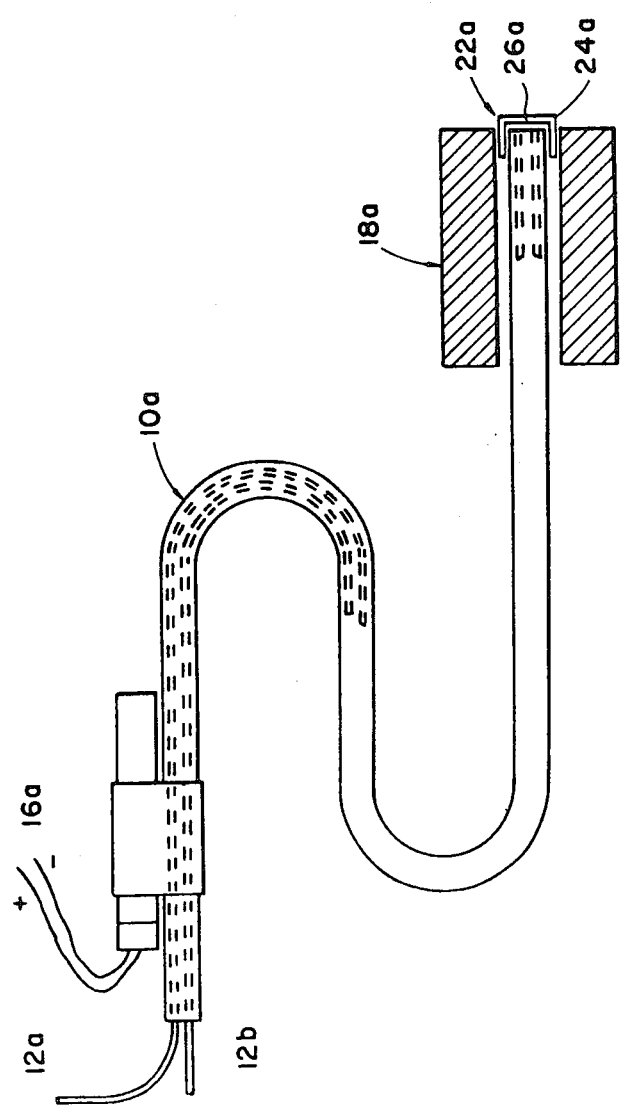
FIG. 4 is a fragmentary schematic view similar to FIG. 1, but showing another embodiment of the invention.

It will be apparent that changes can be made to provide still other embodiments of the invention. In the embodiment of FIG. 4, the detonating cord is provided with two fiber optic channels therein, and the beam splitter is eliminated. The end of the detonating cord is split so that one fiber optic cord 12a sees the lenses 30 while the other fiber optic cord 12b sees the lens 36. With this arrangement, the phosphorescent coating is replaced with a mirror surface 26a. In this arrangement, there is no need for having the time delay periods of the previously described preferred embodiment.

In another embodiment, the phosphorescent coating is replaced by a material which causes the wavelength of the light which it emits to be different from the light which it receives. In this embodiment, the radiant optical source 28 could be changed to emit ultraviolet light, and the coating 26 could be changed to one better suited to give off a visible wavelength in response to the ultraviolet light. The beam splitter 32 would still be used, but under this arrangement, there would be no need for having the time delay periods, provided further that the optical receiver 38 was only sensitive to the visible light wavelengths.

In still another embodiment of the invention, it will be possible to stirp the detonating material off of the end of the detonating cord adjacent the blasting cap 14 to leave nothing but a length of the fiber optic cord 12 for entering a blast proof housing. In this arrangement, the testing head 20 need not be disposable, but can be used over and over again; and it may even be combined with the testing device 50 in a single box. Various other embodiments are bound to occur to those skilled in the art from a reading of the present disclosure.

While the invention has been described in considerable detail, we do not wish to be limited to the particular embodiments shown and described; and it is our intention to cover hereby all novel adaptations, modifications, and arrangements thereof, which come within the practice of those skilled in the art to which the invention relates.

We claim:

1. Detonating cord having spaced apart ends and comprising: at least one fiber optic cord, and a layer of ignition conducting material coextensive with said fiber optic cord, said fiber optic cord being constructed and arranged to conduct light between ends of said ignition conducting material, and said ignition conducting material being mechanically bound in side by side relationship to said fiber optic cord in such manner that external forces sufficient to break said ignition conducting material will disrupt said fiber optic cord.

2. Detonating cord having spaced apart ends and comprising: at least one fiber optic cord, and a layer of ignition conducting material coextensive with said fiber optic cord, said fiber optic cord being constructed and arranged to conduct light between ends of said ignition conducting material, and said fiber optic cord being surrounded by said ignition conducting material.

3. A new and improved detonating cord having spaced apart ends and comprising: a single fiber optic cord generally centrally located in and surrounded by a uniform coating of an ignition conducting material, said fiber optic cord being constructed and arranged to conduct light between ends of said ignition conducting material.

4. A new and improved disposable blast initiating subassembly comprising: at least one fiber optic cord, an ignition conductor mechanically bound in side by side relationship to said fiber optic cord, and means at one end of said cord for receiving light from the other end of said cord and for sending light back to said other end in response to the light received from said other end.

5. A blasting system comprising: a blast igniting primer, a blasting cap remotely located from said primer, an ignition conductor extending between said cap and primer, fiber optic means also extending between said cap and primer with said ignition conductor being mechanically bound in side by side relationship to said fiber optic means in such manner that disruptive forces which cause breakage of said ignition conductor will break said fiber optic means, and light signal means at said primer end for sending a distinguishable light signal through said fiber optic means from said primer end to said cap end.

6. The system of claim 5 wherein said light signal means delivers light over an extended period of time after its initial actuation and without a simultaneous signal being sent from said cap end of said fiber optic means to said light signal means.

7. The system of claim 6 wherein said fiber optic means comprises two lengths of fiber optic material with said light signal means transferring light from one length to the other at the primer end of said ignition conductor.

8. A blasting system comprising: a blast igniting primer, a blasting cap remotely located from said primer, fuse material extending between said cap and primer, first and second fiber optic means also extending between said cap and primer with said fuse material being mechanically bound to at least one of said fiber optic means in side by side relationship and in such manner that disruptive forces which cause breakage of said fuse material will break one of said fiber optic means, and a mirror adjacent said primer for receiving light from said first fiber optic means and returning light back through said second fiber optic means.

9. An ignition conducting device having spaced apart ends and comprising: at least one fiber optic cord, and an ignition conductor coextensive with said fiber optic cord, said fiber optic cord being constructed and arranged to conduct light between ends of said ignition conductor, and said ignition conductor being mechanically bound in side by side relationship to said fiber optic cord in such manner that an external force sufficient to break said ignition conductor will disrupt said fiber optic cord.

* * * * *